May 3 1966 W. BENTLEY 3,249,416
GLASS BENDING MOLD POSITIONING AND ORIENTING APPARATUS
Filed Sept. 12, 1963 3 Sheets-Sheet 2
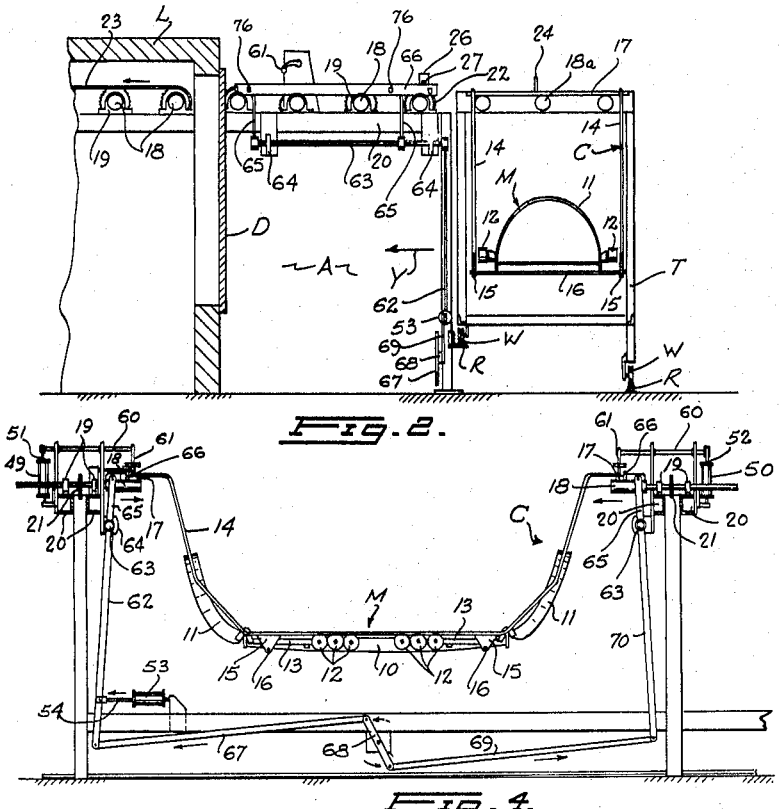
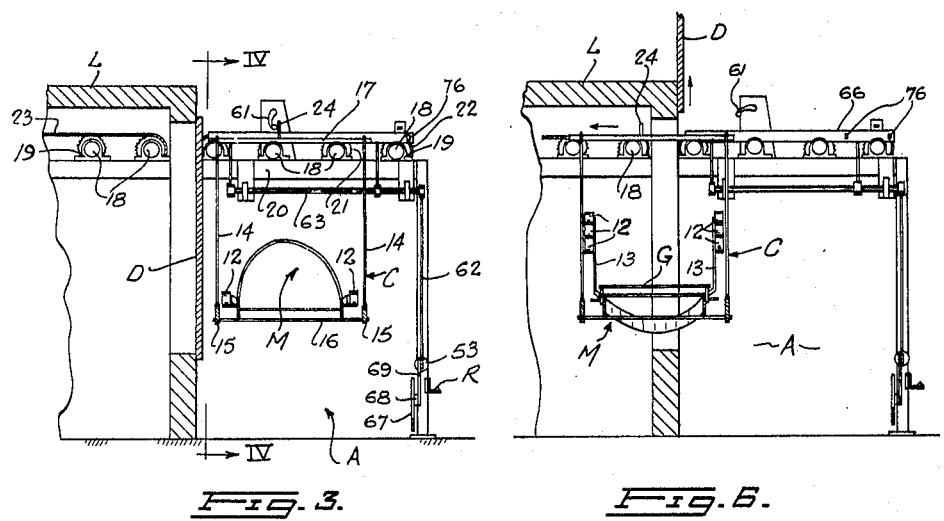
INVENTOR
WILLIAM BENTLEY
BY Cushman, Darby & Cushman
ATTORNEY

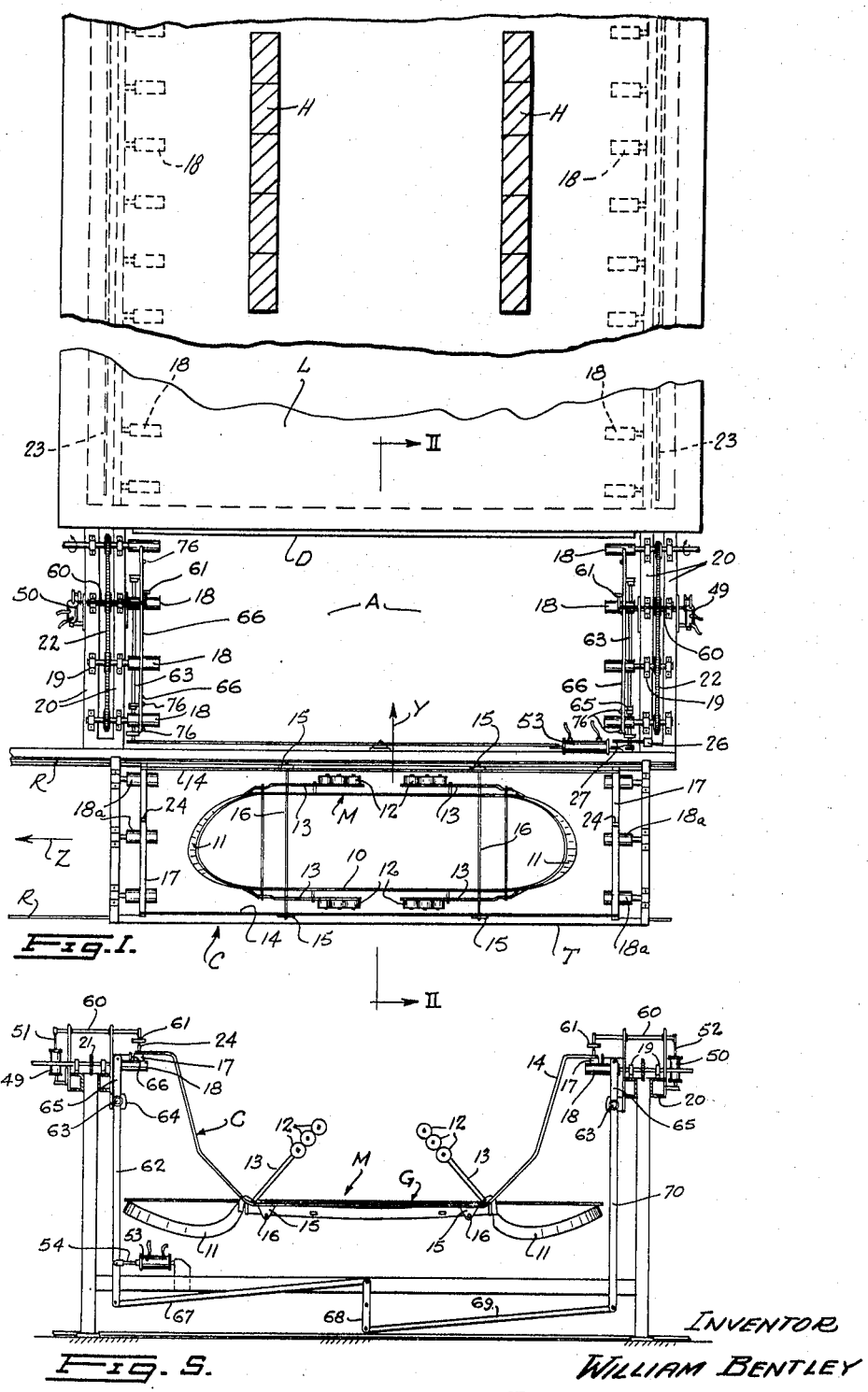

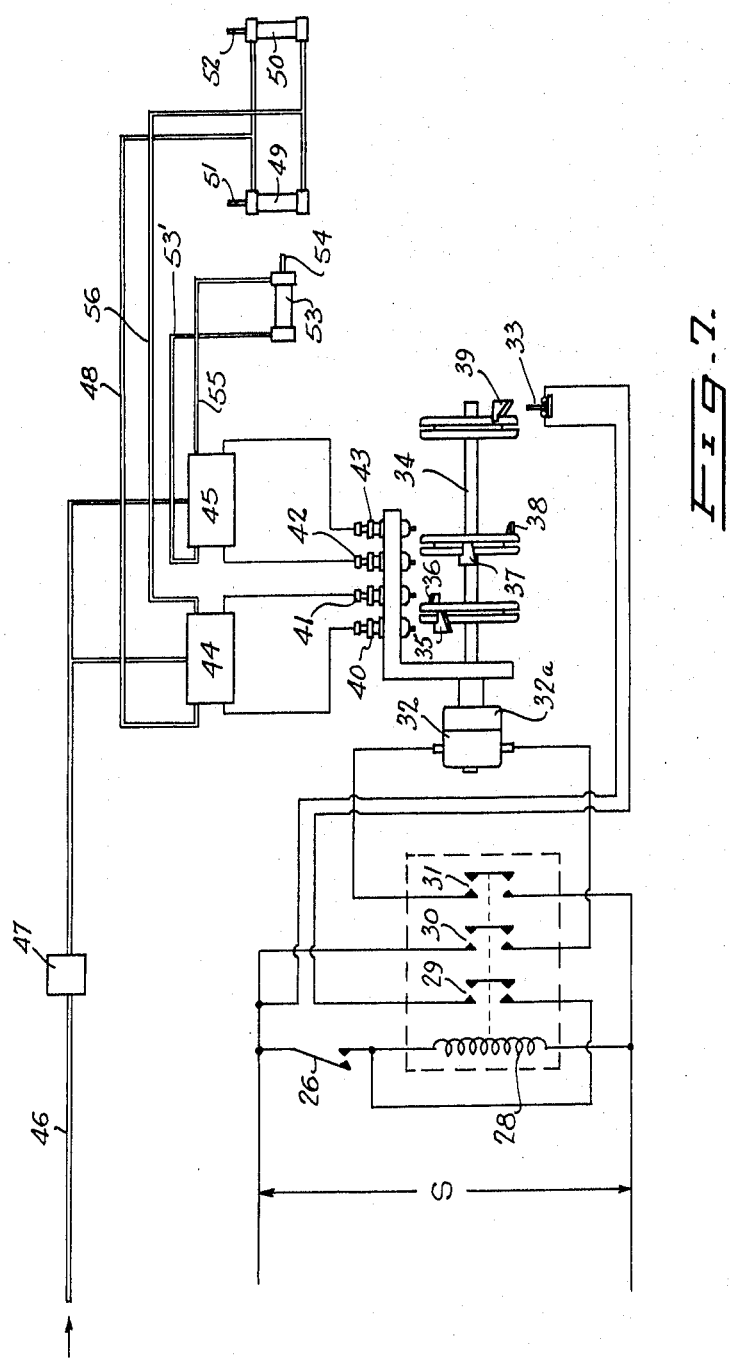

3,249,416
GLASS BENDING MOLD POSITIONING AND ORIENTING APPARATUS

William Bentley, Oshawa, Ontario, Canada, assignor to Pittsburgh Plate Glass Company, Pittsburgh, Pa.
Filed Sept. 12, 1963, Ser. No. 308,487
Claims priority, application Canada, May 26, 1960, 799,738
3 Claims. (Cl. 65—181)

This application is a continuation-in-part of U.S. patent application Serial No. 55,758, now abandoned.

This invention relates to improvements in apparatus for the initial correct positioning and orienting of a travelling assembly comprising a glass bending mould and carrier therefor that is to travel between an operating station and a glass bending lehr along a conveyor, the conveyor being such that, although it defines a path of travel for such assembly, it permits the assembly a measure of freedom for lateral deviation from the desired central path of travel. The operating station may be located at the entrance to or at the exit from the lehr.

In such systems it is always important that the traveling assembly be correctly lined up at the starting or loading station, that is to say that it be initially positioned centrally of the path of travel and that it be oriented in line with the path of travel so that it will travel accurately along such path without migrating gradually to one side or the other as it proceeds along the path through the lehr. This requirement for an accurate positioning and orientation prior to entry of the assembly into the lehr arises because the conveyor travels through an inaccessible, high temperature zone where it is either impossible to effect corrective measures should the travelling assembly deviate from the desired path of travel, or, if possible, inconvenient and complicated.

Accurate positioning of the mould in the lateral direction of the lehr tunnel is desirable at all zones along the lehr tunnel in order that the glass mounted on the mould should receive the planned heating pattern from the lehr heaters at all times. This is especially necessary if the lehr is equipped with heaters specially positioned along a line parallel to said desired path of travel to produce intense local heating in selected areas of the glass, such as areas to be subjected to sharp bending. In this latter case, the heaters in question are often supported from the lehr ceiling or walls so as to be very near the glass, in comparison with the distance of the general lehr heaters, so that even a small lateral deviation of the mould from its proper central path of travel will have a very substantial effect on the performance of the heater. Lateral deviation of the mould can be avoided by making the conveyor in such a manner as to provide no freedom of transverse movement for the travelling assembly of which the mould forms part, but this expedient gives rise to difficulties of construction and operation. It must be borne in mind that such a travelling assembly is subjected during its passage through a glass bending lehr to great extremes of temperature and is constantly expanding and contracting. The fixed structure of the lehr and conveyor is similarly subjected to high temperatures and, to a lesser extent, to fluctuations of temperature. These facts produce structural difficulties in design which militate against the choice of a conveyor system which tightly embraces the travelling assembly on both sides. The preferred form of conveyor for glass bending lehrs is the roller type conveyor, either full rollers extending completely across the lehr or stub rollers extending along the two sides. The assembly travels on these rollers with freedom to expand or shift laterally within the limits of the structure.

As explained above it is always important to effect positioning and orientation of the assembly of glass bending mould and carrier prior to entry of the assembly into the lehr. It may also sometimes be desirable to effect such positioning and orientation of the assembly after it has emerged from the lehr. This is the case when some operation has to be carried out on the bent glass immediately after its exit from the lehr involving the use of apparatus with respect to which the glass has to be oriented before the operation is carried out. An example of such an operation is the application of a coating composition to a prescribed portion of the surface of the hot bent glass.

The principal object of the invention is the provision of means for correctly positioning and orienting a travelling assembly of a glass bending mould and a carrier therefor at an operating station in the vicinity of a glass bending lehr in a path of travel defined by conveyor means extending between the operating station and the lehr. Other objects of the invention will be evident from the following.

The invention will now be exemplified by reference to specific apparatus, for which purpose reference is made to the accompanying drawings, in which:

FIGURE 1 is a plan view of the loading area and vicinity of a glass bending lehr, showing an unloaded mould in position preparatory to travel into the loading station;

FIGURE 2 is a section on the line II—II in FIGURE 1;

FIGURE 3 is a view similar to FIGURE 2 showing the position occupied by the mould carriage a short time later after it has moved into position in the loading station;

FIGURE 4 is a view taken on the line IV—IV in FIGURE 3 and illustrating the operation of the mould centering mechanism;

FIGURE 5 is a view similar to FIGURE 4 at a later stage in the operation and showing the mould centering mechanism in a different condition;

FIGURE 6 is a view similar to FIGURE 3, but showing a still later stage in the operation, with the mould carriage entering the lehr; and FIGURE 7 is a schematic diagram of the control circuit.

FIGURES 1 and 2 show the loading station A of a glass bending lehr L through which a plurality of glass bending moulds M each mounted on a mould carrier C are to be conveyed seriatim. Each mould M consists of a main central portion 10 and two pivotally mounted wing portions 11 rotatable about the end of the main mould portion 10 between the curved orientation seen in FIGURES 1 to 4 and a generally horizontal orientation seen in FIGURES 5 and 6 which is taken up when a flat glass sheet is in position on the mould. The wing portions 11 are urged towards the curved orientation by weights 12 mounted near the ends of side arms 13 connected to the wing portions 11.

The carrier C which supports the mould M consists of a pair of spaced members 14 between which the mould is slung by means of arms 15 depending from the members 14, transverse rods 16 secured to the mould extending into holes in the arms 15. The central portions of the carrier members 14 are straight and horizontal, but the end portions are bent upwardly to conform generally to the shape of the mould in its curved orientation. The extreme ends of the members 14 of the carrier C project horizontally outwardly to be joined together by members 17 to make the carrier C a closed frame. Rigidly mounted on each member 17 of the carrier C is an upwardly projecting finger 24. The members 17 are designed to support the carrier C on a plurality of rollers 18 which constitute a conveyor system which is symmetrical about an axis extending centrally along a path of travel for carrier C. For this purpose rollers 18 extend in two series (one on each side of the apparatus) from loading station A into lehr L through which the mould and glass are to pass.

Rollers 18 are supported on bearings 19 mounted on horizontal beams 20 and are driven through sprockets 21 and chains 22 and 23 from motors (not shown), chains 22 driving the rollers 18 in the loading station A external to the lehr L, while chains 23 drive the rollers 18 inside the lehr L, separate chains being necessary to enable the lehr to be closed off by sliding door D.

As shown in FIGURES 1 and 2 which illustrate the first stage in the operation, the travelling assembly constituted by the mould M and its associated supporting carrier C is brought into position in alignment with the loading station A on a trolley T mounted to travel on wheels W engaging rails R. Trolley T includes two series of free running rollers 18a which, in the position of the trolley T shown in FIGURE 1 adjacent the loading station A, form continuations of the two series of driven rollers 18. The trolley T is brought to the position shown in FIGURES 1 and 2, and then the travelling assembly is moved manually towards the lehr as indicated by the arrows Y in FIGURES 1 and 2 so that it travels off the rollers 18a onto the rollers 18 in the loading station A. The trolley T is then returned in the direction indicated by the arrow Z in FIGURE 1 to receive another travelling assembly of mould and carrier, which assembly will have been in return transit from the far end of the lehr L after use and after the bent glass has been removed.

Mounted on the general fixed structure of the apparatus of which the beams 20 are a part is a starting switch 26 having an actuating arm 27 projecting into the path of travel of the right-hand finger 24, as best seen in FIGURE 1. As the carrier C is pushed into the loading station A (from the position seen in FIGURE 2 to the position seen in FIGURE 3) the right-hand finger 24 moves the arm 27 to actuate the starting switch 26.

As can be seen from the circuit in FIGURE 7, closing of the switch 26 connects solenoid 28 across power supply S. Solenoid 28 operates to close its normally open contacts 29, 30 and 31, contacts 29 being a pair of holding contacts which maintain the solenoid 28 energized after the starting switch 26 has reopened on continued movement of the finger 24 past the switch actuating arm 27, and contacts 30 and 31 supplying power to a motor 32 which then commences to rotate and continues until a normally closed stop switch 33 arranged in series with holding contacts 29 is later opened to de-energize the solenoid in a manner described below.

Motor 32 drives through reduction gearing 32a to a shaft 34 bearing cam plates 35, 36, 37, 38 and 39. Cam plates 35 to 38 are positioned for co-operation respectively with switches 40, 41, 42 and 43, while cam plate 39 is positioned for co-operating with the stop switch 33.

Switches 40 and 41 are connected to pneumatic control valve 44, while switches 42 and 43 are connected to pneumatic control valve 45. Each of these valves receives pressure air from a supply line 46 through a conventional pressure regulator and filter 47. As shaft 34 rotates, cam plate 35 is the first to be operative to cause actuation of switch 40 which causes valve 44 to communicate pressure air to line 48 connected to a pair of cylinders 49 and 50, line 48 being connected to these cylinders in a manner such that pressure in line 48 will effect withdrawal of their piston rod 51 and 52. The next cam plate to operate its associated switch as the shaft 34 rotates is the cam plate 37 which acts on switch 42 to cause valve 45 to admit pressure air to line 53' which extends to a cylinder 53 in a manner to cause such cylinder to extend its piston rod 54 when so subjected to pressure. The third cam plate to operate is the cam plate 38 which actuates switch 43. This causes valve 45 to admit air to line 55 which extends to the other end of the cylinder 53 and thus withdraws the piston rod 54. The cam plate 36 then actuates its associated switch 41 to cause valve 44 to admit pressure air to line 56 to extend piston rods 51 and 52 of cylinders 49 and 50. Each of the valves 44 and 45 is such that as it operates to admit pressure air to a line connected to one end of a cylinder it simultaneously connects to atmosphere the line extending to the other end of the same cylinder. Finally, as the shaft 34 just completes a full rotation, the cam plate 39 momentarily actuates the stop switch 33 to deenergize the motor 32 and leave the pneumatic system at rest and ready for a fresh cycle upon further actuation of the starting switch 26 when a fresh carrier C is moved into loading station A.

As will be evident from the foregoing description of the pneumatic timing mechanism, the first event upon movement of the carrier C into loading station A is retraction of the piston rods 51 and 52 of the cylinders 49 and 50. The rods 51 and 52 are connected through crank arms each to a spindle 60 (best seen in FIGURE 4) on the inner end of which is mounted a depending stop arm 61. In its rest position, the stop arm 61 is raised, as shown in FIGURE 2, but, when the cycle of operations is triggered by closing of the starting switch 26 upon initial travel of a travelling assembly into the loading station A, the energization of stop cylinders 49 and 50 to withdraw their piston rods 51 and 52 turns the two spindles 60 in such direction as to lower their associated stop arms 61 into the operative position shown in FIGURES 3 and 4 in which such stop arms engage the fingers 24 and thus define the limit of travel of the carrier C towards the lehr and bring the travelling assembly to rest in the required loading position shown in FIGURE 3.

The next action by the timing mechanism is extension of cylinder 53 by operation of the switch 42 by cam plate 37. As seen in FIGURE 4 the cylinder 53 which acts as a centering cylinder is mounted on the lower fixed structure of the apparatus, its piston rod 54 being connected to a vertically disposed lever arm 62 which is connected at its upper end to a shaft 63 (see also FIGURE 2), which shaft 63 is mounted in bearings 64 on the fixed structure and has fixed to it upstanding arms 65 which carry an elongated centering member 66. Three rollers 76 are freely pivotally mounted on centering member 66 to project slightly from the surface thereof.

At its lower end the lever 62 is pivotally connected to a link 67 which in turn is articulated to one end of a link 68 the centre point of which is pivotally mounted on the fixed structure and the other end of which is articulated to a further link 69. This series of links communicates the motion to the other side of the apparatus where link 69 is connected to the lower end of a vertically extending lever 70 similar to the lever 62, lever 70 being connected at its upper end to a second shaft 63 and hence to further arms 65 and a second centering member 66 in the same manner as on the side of the apparatus first described. This second centering member 66 has rollers 76 similar to the first such member.

When the cylinder 53 is actuated to extend its piston rod 54, as shown in FIGURE 4, the lever 62 is rotated clockwise, while the links 67, 68 and 69 cause the lever 70 on the opposite side to be rotated anti-clockwise. These rotations move the two centering members 66 towards one another and towards the transverse members 17 which define the lateral edges of the carrier C. Each member 17 includes an outwardly facing lateral surface for engagement by the spaced rollers 76 of centering members 66. This inward movement of the members has a centering effect on the travelling assembly. The two centering members are necessarily moved by the same distance so that, if the rollers 76 of one of them come to bear against the outwardly facing surface of a member 17 before those of the other, the whole travelling assembly will be moved transversely of the loading station until the rollers 76 of both members 66 bear with equal pressure against the associated members 17. A sheet of flat glass G is then placed manually on the mould M which is then entirely ready (both loaded and centered) for travel into the lehr L.

The next action carried out by the timing mechanism is the actuation of switch 43 with consequent reversal of pressures on the cylinder 53 to cause the piston rod 54 to be withdrawn, thus returning levers 62 and 70 to their rest position which is the one shown in FIGURE 5, the members 66 now being withdrawn from the members 17 with which they were previously in contact, leaving the travelling assembly in the required central position properly positioned and aligned for passage into the lehr.

Finally, the timing mechanism operates switch 41 to energize cylinders 49 and 50 to extend their piston rods 51 and 52 and hence to move the stop arms 61 back into their raised positions as shown in FIGURES 5 and 6. The travel of the mould M into the lehr then takes place, this travel being controlled by other conventional timing means (not shown) in a conventional manner, involving raising the door D of the lehr and driving stub rolls 18 to propel the carriage C into the lehr. FIGURE 6 shows this operation in progress. Immediately the travelling assembly has entered the lehr, the door D will be reclosed, loading station A and the apparatus there assembled then being ready to receive another travelling assembly from trolley T. In the meantime, the timing mechanism will have shut itself off by operation of cam plate 39 against switch 33, so that the timing mechanism is likewise ready for a new cycle.

Within the lehr L the sheet G is heated to softening temperature and sags into conformity with the shaping surface provided by the central portion 10 and the wing portions 11 of the mould M. The degree of curvature imparted to the sheet is most severe in regions near the junction of portions 10 and 11, as will be evident from FIGURE 4. To facilitate the production of sharper bends within these regions two lines of additional electrical resistance heaters H are provided within the lehr L, along paths parallel to the length of the lehr L. These additional heaters are in addition to the usual heating elements arranged in rows and columns along the length of the lehr to provide a succession of heating patterns to which the sheet is exposed during its movement through said lehr. These additional heaters H are of conventional type. They are suspended from the roof of the lehr and are so positioned as to impart ancillary heating to the aforementioned regions of the glass sheet which are to be most sharply bent. It is essential that these regions should be conveyed through the lehr L in alignment with the heaters H. This is achieved according to the present invention by accurately aligning the most sharply bent regions of the mould M with the lines of heaters H, prior to entry of the mould M into the bending lehr. In this manner it is ensured that the intense ancillary local heating effected by the lines of heaters H is in fact applied to the appropriate regions of the sheet so that these regions are bent to the more severe curvature prescribed therefor.

As will be apparent from the shape of the carrier C, the invention has been here illustrated in conjunction with a mould and carrier designed for the bending of glass that is subsequently to be tempered, the lehr L serving the dual purpose of bending the glass and bringing it to the correct temperature preparatory to its emergence from the far end of the lehr into position between a pair of blowing frames. The present invention is equally applicable to the combination of a lehr, carrier and mould for bending glass that is not subsequently to be exposed to a tempering treatment, for example glass intended for a subsequent laminating process.

In the embodiment of the invention herein described and illustrated, the centering members serve the dual purpose of centering the travelling assembly and orienting it. The latter effect is achieved by virtue of the elongated nature of these members in the direction of travel of the conveyor, resulting in any misorientation of the travelling assembly being corrected by uneven pressure against the travelling assembly of the forward and rearward rollers 76 of one or both of the centering members. Theoretically only one of the centering members need have two such rollers or other abutment portions spaced apart in the longitudinal direction of the path of travel; the other centering member could apply a single region of pressure to the other side of the travelling assembly at a position longitudinally intermediate the two regions applied by the first member. The orienting effect would then still be achieved.

In fact this entire aspect of the operation of the centering members could theoretically be dispensed with, because the two stop arms 61 will already have achieved a large measure of orientation of the travelling assembly, since the latter is assumed to be pushed onto the rollers 18 until both fingers 24 contact their associated stop arms 61. Conversely, with the centering members constructed to effect orientation, one of the stop arms could be dispensed with, since a single stop arm can effectively serve the function of checking further forward movement of the assembly. In this case the stop arm would preferably be arranged centrally of the loading station, so as not to induce any misalignment of the travelling assembly when the later comes to bear against the stop.

In practice, to provide additional assurance against any slight misalignment (which would represent a substantial lateral displacement by the time the assembly had travelled a distance along the conveyor), it is preferred to employ the double stop arm construction, while at the same time using two elongated centering members that will act as a final check on orientation as well as serving their centering function.

I claim:

1. An apparatus comprising a glass bending lehr having an operating station in the vicinity of an entrance to said lehr; a travelling assembly including a glass bending mould for receiving a flat glass sheet horizontally thereon and for bending said sheet to acquire a desired curvature by conforming to the curved contour of the mould on exposure to the hot atmosphere of the lehr, and a carrier supporting said mould; and conveyor means defining a path of travel for said travelling assembly enabling the travelling assembly to proceed along the path and through said lehr, said operating station being located in said path of travel, said conveyor means supporting said travelling assembly while permitting movement of said assembly transversely of said path of travel along the entire length of said path, said carrier including a transverse member having a surface facing laterally outwardly of said path of travel on each side thereof; and means correctly positioning and orienting said travelling assembly in said path of travel at said operating station, said positioning and orienting means comprising stop means located at said operating station, first actuating means moving said stop means between an operative position in which said stop means lies in a portion of said path of travel to define the limit of movement of said assembly relative to said lehr and an inoperative position in which said stop means is withdrawn from said path of travel to permit free movement of said assembly along said path of travel upon operating of said conveyor means, a pair of centering members positioned each on a respective side of said path of travel selectively engaging said outwardly facing surfaces of said carrier at said operating station, at least one of said centering members comprising two portions spaced apart in the longitudinal direction of said path of travel, second actuating means selectively moving said centering members towards and away from each other between an operative position in which said centering members are both in pressure contact with said surfaces to position said assembly laterally of said path of travel and to orient said assembly in said path of travel, and an inoperative position in which said centering members are both out of pressure contact with said assembly to permit free travel of said assembly along said path of travel upon operation of said conveyor means, and timing mechanism comprising control means sensitive to the entry of said assembly into said operating station selectively controlling said first and second actuating means first moving said stop means to its operative position, then moving said centering members to their operative position, and finally moving said centering members and stop means to their inoperative positions.

2. Apparatus according to claim 1 wherein said conveyor means is symmetrical about an axis extending centrally along said path of travel.

3. An apparatus comprising a glass bending lehr having an operating station in the vicinity of an entrance to said lehr; a travelling assembly including a glass bending mould for receiving a flat glass sheet horizontally thereon and for bending said sheet to acquire a desired curvature by conforming to the curved contour of the mould on exposure to the hot atmosphere of the lehr, said mould having a shaping surface including a sharply bent region, and a carrier supporting said mould; conveyor means defining a path of travel extending through said operating station through said entrance and through said lehr, said conveyor means supporting said travelling assembly and permitting movement of said assembly transversely of said path of travel along the entire length of said path, heating elements positioned within said lehr to produce intense local heating of a selected area of the glass sheet supported above said sharply bent region of said mould shaping surface to effect sharper bending of said selected area than of other areas of said sheet, said carrier including a transverse member having a surface facing laterally outwardly of said path of travel of each side thereof; and means correctly positioning and orienting said travelling assembly in said path of travel at said operating station, said positioning and orienting means comprising stop means located at said operating station, first actuating means selectively moving said stop means between an operative position in which said stop means lies in a portion of said path of travel to define the limit of movement of said assembly relative to said lehr and an inoperative position in which said stop means is withdrawn from said path of travel permitting free movement of said assembly along said path of travel upon operating of said conveyor means, a pair of centering members positioned each on a respective side of said path of travel for selectively engaging with said outwardly facing surfaces of said carrier at said operating station, at least one of said centering members comprising two portions spaced apart in the longitudinal direction of said path of travel, second actuating means selectively moving said centering members towards and away from each other between an operative position in which said centering members are both in pressure contact with said surfaces to position said assembly laterally of said path of travel and to orient said assembly in said path of travel, and an inoperative position in which said centering members are both out of pressure contact with said assembly to permit free travel of said assembly along said path of travel upon operation of said conveyor means, and timing mechanism comprising control means sensitive to the entry of said assembly into said operating station selectively controlling said first and second actuating means and first moving said stop means to its operative position, then moving said centering members to their operative position, and finally moving said centering members and stop means to their inoperative positions, said operative position occupied by said centering members being so located that said sharply bent region of said shaping surface is in alignment with an extension of said line of heating elements whereby said sharply bent region and said selected area of the glass sheet are conveyed in alignment with said line of heaters when said mould is conveyed through said lehr along said path of travel.

References Cited by the Examiner
UNITED STATES PATENTS

| 2,602,554 | 7/1952 | Griffith | 198—29 |
| 2,746,209 | 5/1956 | Walters | 65—288 |
| 2,986,262 | 5/1961 | Powers | 198—29 |

DONALL H. SYLVESTER, *Primary Examiner.*